United States Patent [19]

Sakai et al.

[11] 3,994,827
[45] Nov. 30, 1976

[54] MICRO-ENCAPSULATING METHOD

[75] Inventors: Tomoo Sakai; Tsuguo Kagaya; Kingo Yokota; Kunio Hata, all of Akita, Japan

[73] Assignee: Jujo Paper Co., Ltd., Tokyo, Japan

[22] Filed: Dec. 17, 1974

[21] Appl. No.: 533,506

[30] Foreign Application Priority Data

Dec. 18, 1973 Japan.............................. 48-142123

[52] U.S. Cl..................................... 252/316; 264/4
[51] Int. Cl.²........................................... B01J 13/02
[58] Field of Search............ 252/316; 424/35; 264/4

[56] References Cited
UNITED STATES PATENTS

| | | | |
|---|---|---|---|
| 3,043,782 | 7/1962 | Jensen ................................. | 252/316 |
| 3,328,257 | 6/1967 | Vrancken et al. ............... | 252/316 X |
| 3,594,327 | 7/1971 | Becsey ................................ | 252/316 |
| 3,607,775 | 9/1971 | Yoshida et al. ..................... | 252/316 |
| 3,775,172 | 11/1973 | Clark .............................. | 252/316 X |

Primary Examiner—Richard D. Lovering
Attorney, Agent, or Firm—Stevens, Davis, Miller & Mosher

[57] ABSTRACT

The micro-capsules are formed by providing the coating of capsulating agents comprising acetate sulfate of polyglycosides on the core substances. Aqueous solutions of the salt of cellulose acetate sulfate, starch acetate sulfate or dextran acetate sulfate are used as the said acetate sulfate of polyglycosides and the oily substances such as alkyl biphenyl, liquid paraffin, fat and higher alcohol, and pulverulent substances such as active carbon and yeast are used as the core substances. According to the method of present invention, the core substances are added to aqueous solutions of the said polyglycosides to be emulsified and dispersed therein, and then aqueous solutions of polycations are added there to cause insoluble complex comprising the said polyglycosides and polycations, and as resulting the core substances are coated by insoluble complex. Thereafter the said insoluble complex is stiffened by stiffening reagents or being dispersed in aqueous solutions of polyvinyl alcohol, thus producing stable micro-capsules.

24 Claims, No Drawings

MICRO-ENCAPSULATING METHOD

The present invention is related to a micro-encapsulating method in which coatings are layed to cover the core substances comprising oily substances such as alkyl biphenyl, liquid paraffin, fat and higher alcohol or pulverulent substances such as active carbon and yeast (hereafter referred to as core substances).

In the conventional production method of micro-capsules in which the micro-capsules are formed from the raw material through emulsion of oil in water type (O/W type), the phase separation method has been used, in which the respective phases are separated from aqueous solutions or the like. According to the said method which is generally called the complex coacervation method, the phase separation will occur due to electrical interaction in mixing two aqueous solutions of polycations and polyanions, and condensed phase is used as the capsulating agent. Gelatin is most commonly used in the capsulating agents to be produced through the said complex coacervation process and we know many prior arts adopting primarily gelatin in the capsulating agents, including the system of gelatin-carboxymethylcellulose (see U.S. Pat. No. 3,116,206 (1963)), system of gelatin-polyvinyl benzene sulfonic acid (see British Pat. No. 1,139,964 (1969)) and others.

It has been said that there are no other polymers that can be advantageously substituted for gelatin as microcapsulating agents, in that gelatin is a harmless watersoluble protein having a good ability of film formation, in addition to the fact that the physico-chemical or chemical properties of the aqueous solution thereof can be effectively utilized, including the stability of emulsion, ability of gelation, or the characteristic thereof presented as amphoteric polyelectrolyte.

As described herein above, the method adopting gelatin can produce superior micro-capsules. However, since the method utilizes such very subtle physico-chemical properties in the encapsulating process, remarkably strict controls over the temperature and pH are required, thus complicating the process considerably. Further, there is a shortcoming that the products commercially produced through the said method easily corruptible.

The persons concerned including the inventor have been researching and studying the development of more economical and stable micro-capsulating agents for some time past, and finally found and formulated a novel method which permits to produce highly superior micro-capsules in a simple operation by arranging the method as described and defined in the appended claims.

The polyglycosides containing acetyl and sulfuryl groups referred to in the present invention (hereafter referred to as polyglycosides) denote metallic salts such as sodium or calcium salts of polysaccharides such as starch, dextran and cellulose, and ammonium salts thereof.

The inventors have found that since the said polyglycosides have a portion of OH groups in their molecules esterified with both sulfuryl groups which are hydrophilic and acetyl groups which are hydrophobic, a high surface activity effect is brought forth and, therefore, oil droplets show an extremely high ability of emulsifying and dispersing stability in the system of aqueous solution. Further, the said high surface activity effect leads to the advantages that it facilitates the addition and mixing of other components and that it aids the uniform diffusion of additives and mixtures.

In the meantime, if aqueous solution of polycation or mixed polycations or cationic surfactant (hereafter referred to as polycations) are added to the aqueous solutions of polyglycosides, the former will readily react with the hydrophilic sulfuryl groups contained in polyglycosides' molecules to form polyion-complex or polysalts, to be rendered insoluble. The said insoluble complex proved to be highly stable and soft as well as having an adequate strength.

The present invention materializes a novel micro-encapsulating method in which oily substances and pulverulent substances are used as core substances, by making use of the aforementioned findings.

To further ellucidate the method according to the present invention, the said polyglycosides are first acetylated to contain 10 to 40% of acetyl group as acetic acid ($CH_3COOH$) and then caused to contain at least 4%, preferably 6 to 20%, more preferably 7 to 15% of sulfuryl group as sulfuric acid ($H_2SO_4$). Alternatively, the resultant products may be further converted into the salts of metals such as sodium, calcium or like and ammonium salts thereof.

Then, the polyglycosides thus processed are used by dissolving in water or aqueous solution of methanol. The quantity of the polyglycosides to be dissolved differs more or less according to the kind thereof, but it falls almost in the range of 2 to 10% (by weight) in the case of water and 2 to 15% (by weight) in the case of methanolic aqueous solution. Then, the core substances on which the microcapsules are to be coated are added to the said solution prepared above by an amount corresponding to the specific purposes in the range of 50 to 500% (by weight) in relation to the quantity of the capsulating agents, and the resultant mixture is agitated to produce a stable emulsion or dispersion.

In this case, if oily core substances are used, the particle size can be adjusted by controlling the agitating speed and time.

In encapsulating the oily substances, the emulsifying and dispersing characteristics have a significant effect as the prerequisite to the said encapsulation. Here, the method according to the present invention gives a particularly useful advantage in that highly stable emulsifying and dispersing characteristics required for the micro-encapsulation can be obtained due to the surface activity effect of the polyglycosides. Further according to the invention, indeed, the said emulsifying ability can be fully achieved singly by the polyglycosides, but it may be possible to add this a small amount of nonionic surfactants in order to increase the degree of finess of the emulsion particles.

In the next place, 2 to 20% aqueous solution of the polycations having its mixing rate pre-adjusted is slowly added to the said dispersion while agitating the latter (and heating the system to 40° to 60° C as required), so that the said polycations form together with the said polyglycosides an ideal insoluble complex. In this case, the mixing ratio is in the range between 0.5 and 1.5 as the ratio of effective charge of the said polyglycosides vs. polycation. Then, the said insoluble complex of the said polyglycosides and polycations will adhere slowly to the said core substances dispersed as above to form films therearound.

Preferred polycations generally eligible for use in practice of this invention include cationic surfactants. Such cationic surfactants include: hexadecyl dimethyl ammonium chloride, hexadecyl trimethyl ammonium chloride, hexadecyl dimethyl benzyl ammonium chloride, dodecyl pyridinium chloride, polyoxyethylene laurylamine and the like. Other polycations generally eligible for use in the invention include polycationic materials having weak surface activity. Such polycationic materials include: polyethylene imine, weak cationic derivatives of polyacrylamine, cationic derivatives of polyvinyl pyridine, chitosan and the like.

Further, since acetylated and sulfated polyglycosides bring forth a superior surface activity effect, they are readily dissolved together with many polyanionic materials including carboxymethylcellulose, polyacrylic acid and polystyrene sulfonic acid to form a mixed aqueous solution superior in the surface activity effect. The utilization of the mixed aqueous solution containing these multi-component high molecular substances in the preparation of the capsulating agents results in a wide range of adaptability of the core substances and further in the variety of the capsulating films.

In the case of weak cationic polymers such as polyethylene imine, the reaction proceeds slowly even when the pH of the system is almost close to the neutral point and capsules having uniform films can be formed.

However, in such a case, the pH of the system may be raised beforehand to a value above 7 purposing to control the formation of the polyion-complex, and then the aqueous solution of polycations may be added thereto, followed by a gradual lowering of the pH for causing the complex to be formed. While, in the case of strong cationic polymers, since there is a general tendency that ununiform films will be formed, it is preferable to avoid the use of such polymers as far as possible. In this case, however, the strict temperature control and pH adjustment as required in the case of gelatin are not always necessary.

Although the capsule to be produced through the said process is stable itself and provided with an appropriate strength, it is also possible to obtain capsule having more improved strength, by causing OH groups in the polyglycosides to react with glyoxal, formalin or the like in accordance with the specific purposes.

According to the present invention, oily substances such as alkyl biphenyl, liquid paraffin, fat and higher alcohol and pulverulent substances such as active carbon and yeast are used as the core substances therefor. Besides these, oil soluble substances such as dyes and perfumery which can be dissolved in the said oily substances may be used as the core substances.

As clearly described hereinbefore, the method of the present invention comprises a relatively simple operation as compared with the conventional method and can produce micro-capsules which are not only stable, but also fully durable to the storage over long periods due to its stability against the action of micro-organisms.

Furthermore, it should be noted that the present invention includes the micro-capsules produced in the said micro-encapsulating process.

Hereafter, the present invention will be exemplified by way of the preferred embodiments thereof. However, it is to be understood that these embodiments should not be construed as imposing any limitations on the present invention.

EXAMPLE 1

7g of sodium salts of cellulose acetate sulfate (amount of coupled acetyl and sulfuryl groups is shown in terms of acetic acid and sulfuric acid contents: containing 38% of $CH_3COOH$ and 9% of $H_2SO_4$) was dissolved in 100ml of 20% aqueous solution of methanol to prepare a solution to be used as the capsulating agent. Then, 1ml of 0.5% aqueous solution of non-ionic surfactant Tween-80 was added to the said solution and admixed therein, and the resultant admixture was hardly agitated while adding thereto 30ml of alkyl biphenyl, to cause emulsion of oil in water type to be formed. Thereafter, 25ml of 5% aqueous solution of polyethylene imine was slowly added to the said emulsion while continuing the agitation, to cause the complex of cellulose acetate sulfate and polyethylene imine to be formed. A micro-capsule dispersion was obtained by adding 300ml of 0.5% aqueous solution of polyvinyl alcohol to the said solution containing the said complex and then diluting the resultant solution.

EXAMPLE 2

8g of sodium salts of cellulose acetate sulfate (containing 30.7% of $CH_3COOH$ and 24.3% of $H_2SO_4$) was dissolved in water to obtain 100ml of aqueous solution thereof and then 5% aqueous solution of sodium hydroxide was added to the said solution to shift the pH of the system to the alkaline side. To the resultant solution, 80ml of 5% aqueous solution of polyethylene imine having its pH adjusted beforehand to the alkaline side was added and admixed therewith to prepare a solution to be used as the capsulating agent. The said solution was hardly agitated while adding thereto 50ml of alkyl biphenyl as the core substance for causing emulsion of oil in water type to be formed, and then 5% aqueous solution of hydrochloric acid was added slowly to the said emulsion while continuing the agitation, thus lowering the pH of the system to the acid side, to cause a complex of cellulose acetate sulfate and polyethylene imine to be formed.

Thereafter, a small amount of 0.5% aqueous solution of polyvinyl alcohol was added to the said solution containing the said complex and the resultant mixture was diluted, consequently obtaining a stable micro-capsule dispersion. According to the said method, alkyl biphenyl-containing micro-capsules with the particle size distribution of ten-odd to several tens microms can be obtained.

EXAMPLE 3

7g of sodium salts of cellulose acetate sulfate (containing 38% of $CH_3COOH$ and 9% of $H_2SO_4$) was dissolved in 100ml of water to prepare a solution to be used as the capsulating agent. Then, 80ml of alkyl biphenyl as the core substance was added to the said solution under a hard agitation in order to cause emulsion of oil in water type to be formed. Further, 200ml of 3% aqueous solution of hexadecyl dimethyl ammonium chloride which is one of cationic surfactants was slowly added to the said emulsion for causing the complex of cellulose acetate sulfate and the cationic surfactant to be formed. Thereafter, 100ml of 0.5% of polyvinyl alcohol was added to the said solution containing the said complex, consequently obtaining a stable microcapsule dispersion.

EXAMPLE 4

7g of sodium salts of cellulose acetate sulfate (containing 38% of $CH_3COOH$ and 9% of $H_2SO_4$) was dissolved in 150g of 20% methanolic aqueous solution. To the said solution, 15g of pulverized active carbon (100 to 200 mesh) was added as the core substance and admixed therewith, and then the said admixture was continuously agitated to obtain an uniform dispersion of the core substance.

while continuing the agitation and heating the said dispersion to 60° C, 20g of 5% aqueous solution of polyethylene imine having its pH adjusted to 8.0 was slowly added thereto, and the resultant mixture was further agitated. Thereafter, 15g of 5% aqueous solution of polyethylene imine having its pH adjusted to 6.0 was slowly added thereto and the agitation was continued until an insoluble complex of cellulose acetate sulfate and polyethylene imine was formed.

After lowering the temperature of solution system, 300ml of 0.5% aqueous solution of polyvinyl alcohol was added to the said solution to dilute the latter, consequently obtaining a stable dispersion of micro-capsules.

EXAMPLE 5

8g of calcium salts of dextran acetate sulfate (containing 30% of $CH_3COOH$ and 24% of $H_2SO_4$) was dissolved in 150 g of water. To the resultant solution, 5% aqueous solution of sodium hydroxide was added to raise the pH of the system above 10. Then, 60g of 5% aqueous solution of polyethylene imine having its pH pre-adjusted above 11 was added to the said solution and admixed therewith to prepare a solution to be used as the capsulating agent. The said capsulating agent solution was hardly agitated while being added thereto 50g of alkyl biphenyl in which oil-soluble dye was dissolved beforehand, thus causing emulsion of oil in water type to be formed. After permitting the said emulsion to stand for a time, 200ml of diluting water of pH 9 was added thereto under continuous agitation in parallel with a slow addition of 5% aqueous solution of hydrochloric acid to lower the pH of the system to 4 or 5 slowly, consequently causing a complex of dextran acetate sulfate and polyethylene imine to be formed. After adding thereto 4g of 40% aqueous solution of glyoxal for a stiffening reaction, a small amount of 0.5% aqueous solution of polyvinyl alcohol was added to obtain a stable dispersion of micro-capsules (particle size ranging from several to 10 odd microns).

EXAMPLE 6

6g of sodium salts of starch acetate sulfate (containing 36% of $CH_3COOH$ and 11% of $H_2SO_4$) was dissolved in 100g of water. To the resultant solution, 10g of dry yeast was added as the core substance and the resultant mixture solution was agitated continuously until an uniform dispersion of the said yeast was obtained. After permitting the said dispersion to stand for a time, 150ml of 3% aqueous solution of hexadecyl dimethyl ammonium chloride which is one of cationic surfactants was added thereto slowly and the resultant dispersion was continuously agitated until insoluble complex was obtained. Thereafter, 3% aqueous solution of acetic acid was added to adjust the system pH to 4.0 and the system was heated to 40° C and then left as it stands. After lowering the temperature to the room temperature, 2g of glyoxal was added to further stiffen the said insoluble complex. A dispersion of the microcapsules was obtained by adding thereto 5ml of 2% aqueous solution of polyvinyl alcohol.

EXAMPLE 7

5g of sodium salts of cellulose acetate sulfate (containing 33% of $CH_3COOH$ and 14% of $H_2SO_4$) and 4g of sodium salts of carboxy methyl cellulose (degree of substitution: 0.7) were dissolved in 200g of water. To the resultant solution, 50g of 5% aqueous solution of polyethylene imine was added and admixed therewith. Then, the pH of the system was raised above 11 by using 5% alkaline aqueous solution and alkyl biphenyl was added thereto as the core substance under a hard agitation, consequently causing emulsion of oil in water type. Then, 200ml of diluent water was added and mixed therewith. Thereafter, while immersing the system in a hot bath at 40° to 60° C, 10% aqueous solution of acetic acid was slowly added thereto under a continuous agitation to lower the system pH to 4 or 5. As the result, a complex of cellulose acetate sulfate, carboxy methyl cellulose and polyethylene imine was formed. After lowering the temperature of the system, 1g of 37% aqueous solution of formalin was added thereto for a further stiffening reaction.

According to the said method, alkyl biphenyl-containing micro-capsules with the particle size of several to 10 odd microns and having films comprising three components can be formed.

EXAMPLE 8

7g of sodium salts of cellulose acetate sulfate (containing 38% of $CH_3COOH$ and 9% of $H_2SO_4$) was dissolved in 150ml of 20% methanolic aqueous solution and 5% aqueous solution of sodium hydroxide was added thereto to raise the pH above 10. To the said solution, 25g of 5% aqueous solution of polyethylene imine and 12.5g of 10% aqueous solution of cationic derivative of polyacrylamide (PAA-N-amino methyl derivative, tertiary amine) were added and mixed therewith. To the said mixture solution, 40g of liquid paraffin was added under a hard and continuous agitation to cause emulsion of oil in water type to be formed. After adding thereto 200ml of diluent water, the pH of the system was lowered to 4 or 5 by using 5% aqueous solution of acetic acid, consequently causing a complex of cellulose acetate sulfate, polyethylene imine and the cationic derivative of polyacrylamide.

According to the said method aggregate (aggregate size ranging from 10 odd to several thousand microns) of liquid paraffin-containing micro-capsules having the particle size of several microns can be obtained.

What we claim is:

1. A method for producing micro-capsules comprising: preparing an aqueous solution of polyglycosides containing an acetyl group and a sulfuryl group; adding a core substance to said aqueous solution, followed by the emulsification and dispersion thereof; and forming an insoluble complex of said polyglycosides with at least one polycation selected from the group consisting of hexadecyl dimethyl ammonium chloride, hexadecyl trimethyl ammonium chloride, hexadecyl dimethyl benzyl ammonium chloride, dodecyl pyridinium chloride, polyoxyethylene laurylamine, polyethylene imine, weak cationic derivatives of polyacrylamine, cationic derivatives of polyvinyl pyridine, chitosan and mixtures thereof by adding the polycation to said dispersion.

2. A method for producing micro-capsules comprising: preparing an aqueous solution of polyglycosides containing an acetyl group and a sulfuryl group; adding a core substance to said aqueous solution, followed by the emulsification and dispersion thereof; forming an insoluble complex from said polyglycosides with polycations selected from the group consisting of hexadecyl dimethyl ammonium chloride, hexadecyl trimethyl ammonium chloride, hexadecyl dimethyl benzyl ammonium chloride, dodecyl pyridinium chloride, polyoxyethylene laurylamine, polyethylene imine, weak cationic derivatives of polyacrylamine, cationic derivatives of polyvinyl pyridine, chitosan and mixtures thereof by adding said polycations to said dispersion, which complex coats said core substance; stiffening the said insoluble complex by a stiffening reaction and stabilizing said insoluble complex by dispersing said complex in an aqueous solution of polyvinyl alcohol.

3. A method as defined in claim 1, wherein said aqueous solution of polyglycosides is mixed with polyanionic substances soluble together with the polyglycosides.

4. A method as defined in claim 3, wherein at least one of said derivatives is selected from the group consisting of carboxymethyl cellulose, polyacrylic acid and polystyrene sulfonic acid.

5. A method as defined in claim 1, wherein said aqueous solution of polyglycosides comprises an alcoholic aqueous solution.

6. A method as defined in claim 5, wherein said alcoholic aqueous solution comprises an aqueous solution of methanol.

7. A method as defined in claim 1, wherein said polycation is at least one member selected from the group consisting of weak cationic derivatives of polyacrylamide, cationic derivatives of polyvinyl pyridine and chitosan.

8. A method as defined in claim 1, wherein said polycation comprises cationic surfactant.

9. A methods as defined in claim 8, wherein said cationic surfactant is at least one member selected from the group consisting of hexadecyl dimethylammonium chloride, hexadecyl trimethyl ammonium chloride, hexadecyl dimethyl benzyl ammonium chloride, dodecyl pyridinium chloride and polyoxyethylene laurylamine.

10. A method as defined in claim 1, wherein said core substance comprises an oily substance selected from the group consisting of alkyl biphenyl, liquid paraffin, fat and higher alcohol.

11. A method as defined in claim 10, wherein said core substance comprises an oil-soluble substance which can be dissolved in the said oily substance.

12. A method as defined in claim 1, wherein said core substance comprises a pulverulent substance.

13. A method as defined in claim 12, wherein said pulverulent substance is active carbon.

14. A method as defined in claim 12, wherein said pulverulent substance is yeast.

15. A method as defined in claim 1, wherein said emulsified dispersion of said core substance is adjusted so as to show a pH value higher than 7, and said pH value is slowly lowered to 5 or 6 after the addition of said polycation.

16. Micro-capsules produced by the method as defined in claim 1.

17. A method as defined in claim 1, wherein said polyglycosides comprise salts of said polyglycosides.

18. A method as defined in claim 1, wherein said polyglycosides are sodium salts of said polyglycosides.

19. A method as defined in claim 1, wherein said polyglycosides are calcium salts of said polyglycosides.

20. A method as defined in claim 1, wherein said polyglycosides are ammonium salts of said polyglycosides.

21. A method for producing micro-capsules comprising preparing 2 to 20% of an aqueous solution of cellulose acetate sulfate containing at least 4% of sulfuryl groups in terms of sulfuric acid content; forming an emulsion of oil in water type by adding 50 to 500% of an oily substance in relation to the capsulating agent; forming an insoluble complex by adding an aqueous solution of polycations selected from the group consisting of hexadecyl dimethyl ammonium chloride, hexadecyl trimethyl ammonium chloride, hexadecyl dimethyl benzyl ammonium chloride, dodecyl pyridinium chloride, polyoxyethylene laurylamine, polyethylene imine, weak cationic derivatives of polyacrylamine, cationic derivatives of polyvinyl pyridine, chitosan and mixtures thereof to said emulsion; and diluting said insoluble complex by adding said complex totally in an aqueous solution of polyvinyl alcohol.

22. A method for producing micro-capsules comprising: preparing an aqueous solution of pH 9 to 10 by adding an aqueous solution of sodium hydroxide to an aqueous solution of cellulose acetate sulfate; preparing a solution of capsulating agent by adding an aqueous solution of polyethylene imine to said aqueous solution, the pH of the said polyethylene imine solution being adjusted beforehand to 9 to 10; forming an emulsion by adding alkyl biphenyl to said solution of capsulating agent; lowering the pH of the system by adding an aqueous solution of hydrochloric acid to the said emulsion, consequently causing an insoluble complex to be formed; stiffening the insoluble complex by glyoxal; and adding an aqueous solution of polyvinyl alcohol to the said insoluble complex.

23. A method for producing micro-capsules comprising: preparing an aqueous solution of methanol by dissolving sodium salts of cellulose acetate sulfate in it; adjusting said solution to a pH 9 to 10 by adding an aqueous solution of sodium hydroxide to said solution; admixing a mixture of an aqueous solution of polyethylene imine and a cationic derivative of polyacrylamide having the pH adjusted beforehand to a value between 9 and 10 with said aqueous solution; forming an emulsion by adding the core substance to said mixture solution; and lowering the pH of said emulsion to 5 to 6, thus causing the formation of a complex of cellulose acetate sulfate, polyethylene imine and cationic derivative of polyacrylamide.

24. A method for producing micro-capsules comprising: preparing a mixed aqueous solution of sodium salts of carboxy methyl cellulose and sodium salts of cellulose acetate sulfate; adjusting its pH to a value between 9 and 10; preparing a dispersion by adding an aqueous solution of polyethylene imine having its pH adjusted beforehand to a value between 9 and 10 to said aqueous solution; forming an emulsion by adding the core substance to said dispersion; and lowering the pH of the said emulsion to 5 to 6, consequently forming a complex of cellulose acetate sulfate, carboxy methyl cellulose and polyethylene imine.

\* \* \* \* \*